Patented Dec. 20, 1938

2,140,938

UNITED STATES PATENT OFFICE 2,140,938

2-HYDROXYMETHYL-1,3-DIOXOLANE

Raymond W. McNamee, South Charleston, and Charles M. Blair, Charleston, W. Va., assignors to Carbide and Carbon Chemicals Corporation, a corporation of New York No Drawing. Application July 1, 1936, Serial No. 88,336

13 Claims. (Cl. 260—338)

This invention relates to a new derivative of 1,3-dioxolane and includes a process for preparing it. The new compound may be designated as 2-hydroxymethyl-1,3-dioxolane

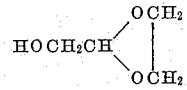

which, when pure, is a colorless liquid with a boiling point of 97° C. at a pressure of 30 mm. of mercury, and a specific gravity of 1.2026 at 20°/20° C. This substance can be prepared by a process which broadly comprises the simultaneous dehydrogenation and dehydration of ethylene glycol.

The process of simultaneous dehydrogenation and dehydration can be accomplished by passing the vapors of ethylene glycol, either alone or in conjunction with an inert diluent, such as nitrogen, over a suitable catalyst at temperatures of from about 200° to about 350° C. The reaction products, with the exception of hydrogen, may be condensed, and treated to separate the desired product by any suitable means, such as fractional distillation, from unchanged ethylene glycol, water and a small amount of diacetyl which occurs as a by-product in the reaction. The crude 2-hydroxymethyl-1,3-dioxolane may then be purified by any convenient method. Where an inert diluent, for example, nitrogen, is employed, it is notable that the catalyst retains its maximum efficiency of operation throughout extended periods of use.

A satisfactory catalyst for use in this process may be one comprising finely divided reduced copper together with some chromium (probably in the form of an oxide) supported on an inert carrier, such as porous silica filter stone. It is possible to produce this catalyst by impregnating the inert carrier with a solution of the metallic salts, for example, their nitrates, in the desired ratio, followed by roasting and reduction of the impregnated material. The proportions of copper and chromium in such a catalyst may vary, but in general, not more than 5% chromium is desirable. Other dehydrogenating catalysts performing a similar function may be used; for example, copper alone, or supported on an inert carrier, may be employed, as well as nickel, platinum, silver, palladium and zinc oxide. The catalysts may be used in the form of pellets, in sponge form, or in various other known ways. These and other catalysts of similar constitution are known in the art and form no essential part of this invention.

The following is a description of one method for practicing the invention:

One and one-half liters of a catalyst comprising reduced copper and chromium and a carrier were charged into a chamber approximately two inches in diameter. This catalyst contained copper and chromium in the proportions of 96.5% and 3.5%, respectively, and the carrier was porous silica. Ethylene glycol vapor at the rate of 512 grams per hour was conducted over the catalyst, which was maintained at a temperature of approximately 285° C. Under these conditions, 2-hydroxymethyl-1,3-dioxolane was produced in an overall yield of 38.1%, and the efficiency of the process was found to be 82.3%.

The formation of the new compound by the simultaneous dehydrogenation and dehydration of ethylene glycol may be considered as a one-step reaction according to the equation:

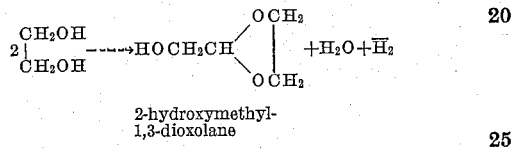

2-hydroxymethyl-1,3-dioxolane

The process can be varied considerably in operation by the use of other catalysts which perform a function similar to the preferred copper and chromium catalyst. In general, temperatures from about 200° to about 350° C. at atmospheric pressure are suitable, and within this range temperatures of about 250° to about 325° C. are preferred. It is clear that other temperatures could be used depending principally upon the pressure, and the type of catalyst selected. The rate of flow of the ethylene glycol vapor controls the formation of 2-hydroxymethyl-1,3-dioxolane, the production of the latter increasing with the rate of flow.

Other modifications of the process which do not materially alter the modus operandum will be apparent, and such modifications are included within the invention as defined by the appended claims.

We claim:

1. As a chemical compound, 2-hydroxymethyl-1,3-dioxolane, being characterized as a colorless liquid with a boiling point of 97° C. at a pressure of 30 mm. of mercury and having a specific gravity of 1.2026 at 20°/20° C.

2. Process for preparing 2-hydroxymethyl-1,3-dioxolane which comprises simultaneously dehydrogenating and dehydrating ethylene glycol vapor by the aid of a metallic dehydrogenating catalyst at an elevated temperature not exceeding 350° C.

3. Process for preparing 2-hydroxymethyl-1,3-dioxolane which comprises simultaneously dehydrogenating and dehydrating ethylene glycol vapor by the aid of a reduced copper catalyst at an elevated temperature not exceeding 350° C.

4. Process for preparing 2-hydroxymethyl-1,3-dioxolane which comprises simultaneously dehydrogenating and dehydrating ethylene glycol vapor by the aid of a reduced copper and chromium catalyst at an elevated temperature not exceeding 350° C.

5. Process for the preparation of 2-hydroxymethyl-1,3-dioxolane which comprises simultaneously dehydrogenating and dehydrating ethylene glycol vapor in the presence of an inert diluent by the aid of a copper and chromium catalyst at an elevated temperature not exceeding 350° C.

6. Process for preparing 2-hydroxymethyl-1,3-dioxolane which comprises simultaneously dehydrogenating and dehydrating ethylene glycol vapor by the aid of a reduced copper and chromium catalyst supported on an inert carrier, and in which the chromium content is not greater than 5%, and at an elevated temperature not exceeding 350° C.

7. Process for preparing 2-hydroxymethyl-1,3-dioxolane which comprises simultaneously dehydrogenating and dehydrating ethylene glycol by the aid of a metallic dehydrogenating catalyst at a temperature of from about 200° to about 350° C.

8. Process for preparing 2-hydroxymethyl-1,3-dioxolane which comprises simultaneously dehydrogenating and dehydrating ethylene glycol vapor in the presence of an inert diluent by the aid of a metallic dehydrogenating catalyst and at a temperature of from about 200° to about 350° C.

9. Process for preparing 2-hydroxymethyl-1,3-dioxolane which comprises simultaneously dehydrogenating and dehydrating ethylene glycol vapor by the aid of a reduced copper and chromium catalyst at a temperature of from 200° to about 350° C.

10. Process for preparing 2-hydroxymethyl-1,3-dioxolane which comprises simultaneously dehydrogenating and dehydrating ethylene glycol vapor mixed with an inert diluent by the aid of a reduced copper and chromium catalyst and at a temperature of from 200° to about 350° C.

11. Process for preparing 2-hydroxymethyl-1,3-dioxolane which comprises simultaneously dehydrogenating and dehydrating ethylene glycol vapor by the aid of a reduced copper and chromium catalyst and at a temperature of from about 250° to about 325° C.

12. Process for preparing 2-hydroxymethyl-1,3-dioxolane which comprises simultaneously dehydrogenating and dehydrating ethylene glycol vapor by the aid of a reduced copper and chromium catalyst having a chromium content not greater than 5%, and at a temperature of about 285° C.

13. Process for preparing 2-hydroxymethyl-1,3-dioxolane which comprises simultaneously dehydrogenating and dehydrating ethylene glycol vapor in the presence of an inert diluent by the aid of a reduced copper and chromium catalyst having a chromium content not greater than 5%, and at a temperature of about 285° C.

RAYMOND W. McNAMEE.
CHARLES M. BLAIR.